June 8, 1971  D. FINE  3,583,086
ROAD MAP READER
Filed Nov. 1, 1968  2 Sheets-Sheet 1
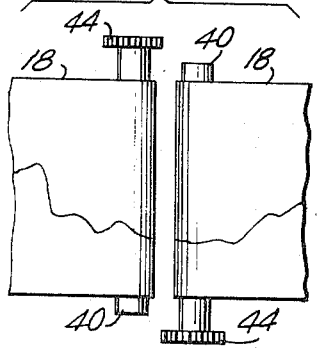
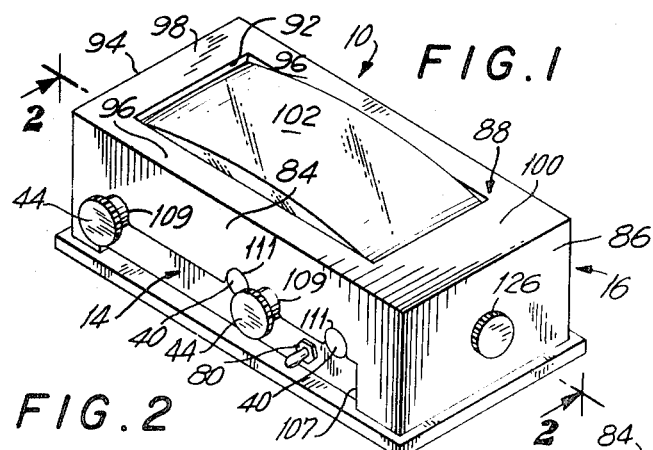
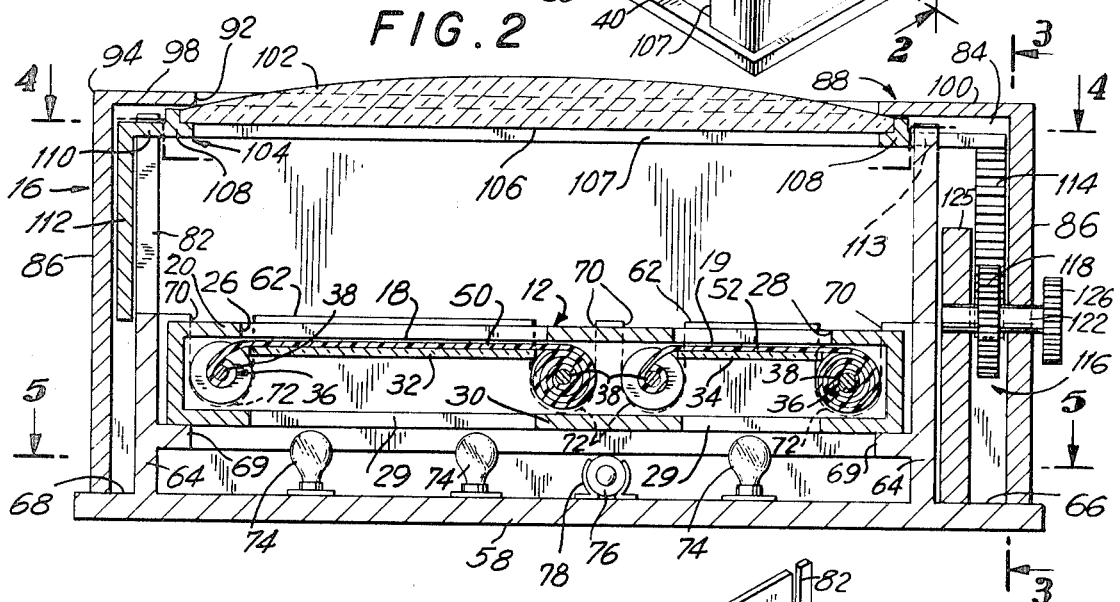
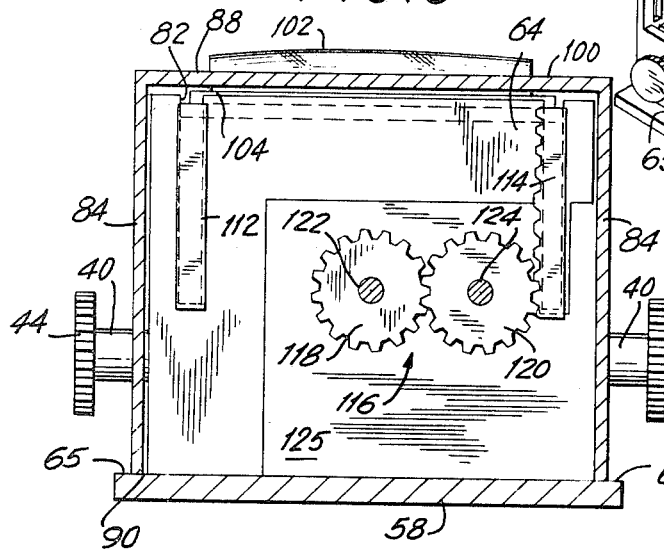
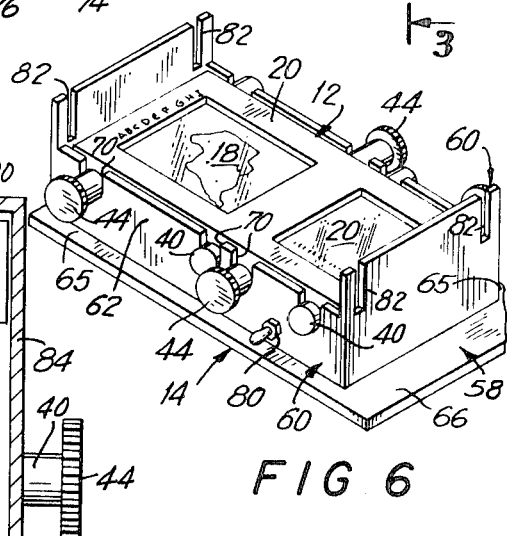
INVENTOR
DAVID FINE
BY Kirschstein, Kirschstein, Ottinger & Frank
ATTORNEYS June 8, 1971  D. FINE  3,583,086
ROAD MAP READER
Filed Nov. 1, 1968  2 Sheets-Sheet 2
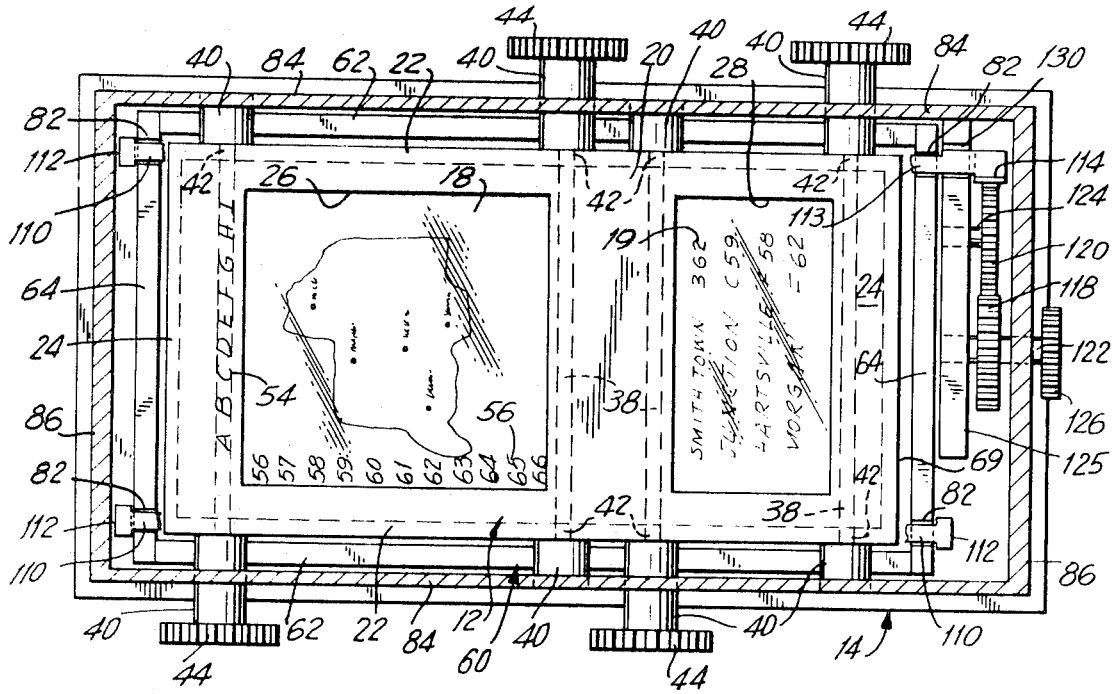
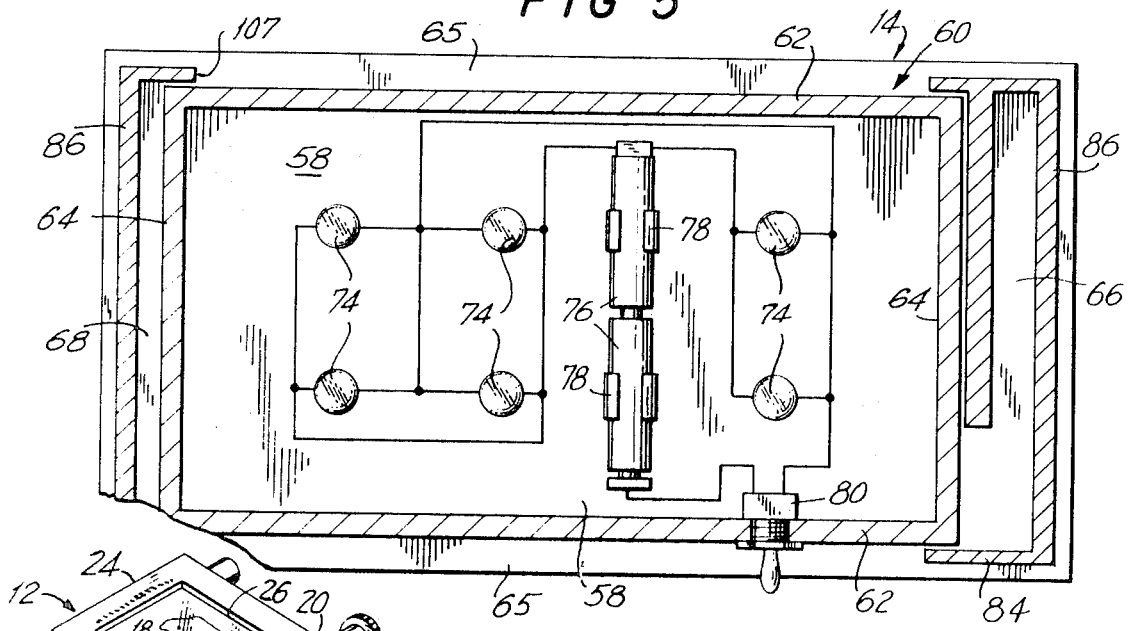
INVENTOR
DAVID FINE.
BY
Kirschstein, Kirschstein, Ottinger & Frank
ATTORNEYS United States Patent Office 3,583,086
Patented June 8, 1971

3,583,086
ROAD MAP READER
David Fine, 143—11 25th Ave.,
Whitestone, N.Y. 11357
Filed Nov. 1, 1968, Ser. No. 772,498
Int. Cl. G09f 11/24
U.S. Cl. 40—86                                    15 Claims

ABSTRACT OF THE DISCLOSURE

An illuminated road map reader consists of a cabinet base which interchangeably accommodates any selected one of a plurality of available open-bottomed cassettes. Each of the cassettes contains a permanently mounted spooled elongated road map and a permanently mounted spooled elongated information guide threaded over respective pellucid window viewing supports. A cabinet top removably covers the cassette and a portion of the base except in the area of the viewing supports. The pellucid supports are illuminated from their bottom faces by electric lights within the cabinet base. A magnifying lens is vertically movable within a viewing opening in the cover to adjustably magnify the portions of the map and the information guide over the window viewing supports.

BACKGROUND OF THE INVENTION

(1) Field of the invention

Devices for viewing selected portions of maps and information guides.

(2) Description of the prior art

The driver of an automobile often finds it necessary to use road maps for assistance in both local about town driving, wherein the location of specific streets is desired and, of course, on long trips.

Various automobile associations have been known to provide strip maps wherein selected portions of larger maps are digested and printed upon rectangular strips of paper which are selected for the specific journey and bound as a booklet. When using the map the driver would then turn successive pages as the course of his trip progresses.

It has been additionally known heretofore to use, in conjunction with such strip maps, local information or street index guides which provide the rectangular and horizontal coordinates along the strip map for a desired point of interest, street, or locality. The strip map would usually contain, along its borders, both the vertical and horizontal coordinates and an information index guide indicating the selected coordinates of the desired point. The motorist would then, after finding the coordinates, locate the desired position upon the map at the intersection of a horizontal and a vertical line each running through the respective coordinate.

The use of such strip maps and folding road maps still leaves much to be desired as the folding maps are unduly large and tend to become cumbersome. Additionally, the strip maps entail considerable flipping or turning of pages to locate points of interest for the information index guide. These disadvantages would, of course, become magnified when the motorist is lost, especially at night. Many times a lost motorist may be observed with a flashlight in hand, probing through the road map.

Devices have been provided heretofore which, to some extent, improve over this situation. Basically, these prior art devices consisted of two spools and a strip map which travelled between the spools. A portion of the map was viewable through a window so that as a spool was wound, the viewable portion of the strip changed. The disadvantages in these prior devices included the fact that they were generally complicated and cumbersome, involving a plurality of components which resulted in greater manufacturing expense and high sales price. Additionally, they necessitated the manual threading of various spool road map strips on the take-up and supply spools and through the viewing window. Thus, prior devices which revealed selected portions of a continuous strip map did not gain wide acceptance.

SUMMARY OF THE INVENTION

It is an object of the present invention to provide a road map reader which is so constructed that it is not subject to any of the foregoing disadvantages.

More specifically, it is an object of the present invention to provide a road map reader of the character described which is simple and rugged in construction and which can be fabricated by mass production methods at an appreciably lower cost than prior devices designed to less efficiently serve the same function.

It is another object of the invention to provide a road map reader of the character described wherein selected portions of both an elongated strip road map and a coordinated, i.e. matched elongated strip road map index guide are viewable.

Another object of the present invention is to provide a road map reader of the character described wherein selected points on the viewable portion of an elongated strip road map may be located by coordinate guides.

Yet another object of the invention is to provide a road map viewing casette of the character described wherein selected portions of an elongated strip road map and guide are viewable in magnified proportions.

A further object of the present invention is to provide a road map reader of the character described wherein the magnification of selected portions of an elongated strip road map and guide may be adjustably increased.

A still further object of the present invention is to provide a road map reader of the character described wherein selected portions of an elongated strip road map and guide may be illuminated for viewing.

Still another object of the present invention is to provide a housing adapted to receive any one of a plurality of strip road map and guide viewing cassettes and illuminate portions of an elongated strip road map and guide carried by the selected cassette.

Other objects of the invention in part will be obvious and in part will be pointed out hereinafter.

The invention accordingly consists of the features of construction, combinations of elements and arrangements of parts which will be exemplified in the road map reader hereinafter described and of which the scope of application will be indicated in the appended claims.

BRIEF DESCRIPTION OF THE DRAWINGS

In the accompanying drawings in which is shown one of the various embodiments of the present invention:

FIG. 1 is an isometric view of the assembled map reader constructed in accordance with and embodying the invention;

FIG. 2 is an enlarged cross-sectional view of the map reader, the same being taken substantially along the line 2—2 of FIG. 1;

FIGS. 3 and 4 are cross-sectional views taken substantially along the lines 3—3 and 4—4, respectively, of FIG. 2;

FIG. 5 is a cross-sectional view taken substantially along the line 5—5 of FIG. 2 and showing in schematic form, the electrical circuit embodied in the invention;

FIG. 6 is an isometric view of the map viewer base with a map viewer cassette nestably received therein;

FIG. 7 is an isometric view of a map viewer cassette construction embodying the invention; and FIG. 8 is a fragmentary view showing the map portions of two successive cassettes.

DESCRIPTION OF THE PREFERRED EMBODIMENT

The preferred embodiment generally includes a map reader which has a map reading cassette nestably received within a cabinet base, with portions of the base and all of the cassette being removably enclosed by a cover. The base and cover are so constructed as to accommodate any selected one of a plurality of available cassettes. Each cassette contains a spooled elongated strip map, a spooled information guide, and appropriate supply and take-up spools. Coordinated, i.e. matched, selected portions of the map and guide are supported on viewing areas on the face of the cassette. Knobs extend from the supply and take-up spools enabling a user to position the desired coordinated portions of a strip map and information guide over the viewing areas.

Provisions are incorporated within the cabinet base for illuminating the map and guide portions at the viewing areas. Additionally included in the cover is a magnifying lens and a mechanism for varying the distances between the viewing areas and the lens in order to vary the magnifying effect of the lens.

Referring now in detail to the drawings, the map reader 10 includes a cassette 12. It can be seen from an observation of FIG. 7 and FIGS. 2, 4 and 6 that the cassette 12 is generally rectangular in all cross-sections. On the top of the cassette, a rectangular face 20 is formed integrally with side and end walls 22 and 24, respectively. Two viewing windows are provided in the face 20, and may be constructed such that the first window 26 is square in shape and the other or second window 28 is rectangular, for example. These openings or windows, 26 and 28 serve as viewing areas for the map and information guide in a manner to be hereinafter described.

Openings 29 of a shape which conforms to the viewing windows are formed in the bottom 30 of the cassette and are positioned in opposed relationship to the viewing windows 26 and 28 for the purpose of admitting illumination in a manner to be subsequently described. Two pellucid plates 32 and 34 transversely bridge the space below the openings 26 and 28 within the interior of the cassette. These plates 32 and 34 are secured on the opposed side walls 22 beneath the openings 26 and 28 and are surfaces over which a spooled map 18 and a spooled information guide 19 are threaded under the openings 26 and 28. They thus serve to support in flat positions beneath the viewing windows, the portions of the map and information guide which are selected for viewing. An additional function of the plates 32 and 34 is to enable light to be cast on selected portions of the map and information guide which are beneath the viewing windows 26 and 28.

Also mounted within the cassette 12 are two pairs of parallel spools 36. Each spool consists of a cylindrical core 38 with enlarged cylindrical ends 40. The spools 36 are journalled for rotation within the cassette 12 by circular openings 42 in the side walls 22. Said circular openings 42 are of a diameter which is slightly larger than said cores 38 so that the spools 36 are rotatable within said cassette 12. The ends 40 are concentrically mounted to the opposite ends of the cores 38 and are located to lightly bear against the exteriors of the side walls of the cassette so as to prevent lateral displacement of the spools. The tip of one of the enlarged cylindrical ends 40 of each spool 36 terminates at a knob 44 with ribbing at the periphery thereof to facilitate manipulation. As shown in FIG. 4, the knobs 44 of one of each pair of spools is located at one side of the cassette and of the other pair of spools, the opposite side.

The elongated strip map 18 constitutes a translucent elongated web 50 made, preferably of film; however other forms of material such as paper may be employed. Appropriate roads, symbols and legends such as are common to road maps are imprinted on said web. The web 50 is secured at each end to the cylindrical core 38 of a different one of an associated pair of spools after being threaded under the viewing window 26 and over the pellucid plate 32.

The information guide 19 similarly constitutes a translucent elongated web 52 made for example, of film or paper, and imprinted with suitable textural material. It is secured at each end to the cylindrical core 38 of a different one of an associated pair of spools after being threaded under the viewing window 28 and over the pellucid plate 34.

West-east oriented coordinate indicia 54 (for example) are imprinted on the face 20 of the cassette alongside a transverse edge of the viewing window 26 and serve as an aid in mentally dividing the map area within the viewing window 26 into north-south elongated strips.

The map 18 itself has north-south oriented coordinate indicia 56 imprinted on an edge thereon so as to be visible within the viewable areas on the map 18. The north-south coordinate indicia 56 serve as an aid in mentally dividing the map area, within the viewing window 26, into transverse elongated strips running from westerly to easterly positions on the map surface.

The information guide 19 contains a list of locations, streets, sights or points of interest which appear in the map 18. The list may be arranged in any suitable order, either geographical or alphabetical. Next to each item on the list, the appropriate coordinates are indicated for locating its position on the map 18. With the coordinates known, the user merely locates the west-east oriented coordinates on the face 20 and the north-south oriented coordinates on the map 18. The desired portion is at the intersection of the two coordinates.

It will be appreciated that the cassette 12 is suitable for independent use as a map reading device without the use of a cabinet base or cover.

The operation and utility of the cassette 12 is greatly enhanced however when used in conjunction with a cabinet base 14.

Referring now in detail to the cabinet base 14, it can be seen from an observation of the figures that said cabinet base is constructed with a flat rectangular bottom 58 having a housing 60 projecting upwardly therefrom. The horizontal cross-sectional shape of the housing is rectangular with opposite side walls 62 and end walls 64. The housing is shaped so that the cassette 12 may be received in horizontal position within the hollow interior of the same. Accordingly, the side walls 62 and end walls 64 are dimensioned to form a hollow space that is slightly larger than the horizontal dimensions of the cassette 12.

In order to provide a mating cooperating relationship between the base 14 and a cover 16, the external rectangular horizontal cross-sectional dimensions of the housing 60 are less than the rectangular horizontal dimensions of the base bottom 58 so that the housing is set in from the periphery of the base. The housing 60 is positioned on the base bottom 58 with its side walls 62 equidistantly spaced inwardly from the side edges of the bottom 58 whereby a ledge 65 of uniform width extends beyond each side wall 62. The end walls 64 are positioned in inwardly offset relationship to the end edges of the base 58 so that at one end of the base bottom 58 an enlarged ledge 66 extends beyond the end wall 64 and at the other end, a smaller ledge 68 extends beyond the opposite end wall 64.

As previously mentioned, the cassette 12 is nestably received within the housing 60. Suitable illuminating means is positioned on the base bottom 58 within the housing 60, and, in order to prevent interference between the bottom of the cassette and the illuminating means, the housing includes means to maintain the cassette elevated above the base bottom 58. For this purpose, a horizontal flange 69 (see FIG. 2) projects inwardly from the interior of the walls of the housing 60 and is positioned above the illuminating means. This flange 69 serves as a seat on which the bottom 30 of a cassette is adapted to rest.

To prevent interference between the enlarged cylindrical ends 40 of the spools 36 and the side walls 62 of the housing 60, the side walls are indented to form U-shaped channels 70 which open at the upper edges of the side walls 62 to receive the enlarged cylindrical ends 40. The opposed edges of the channels are spaced apart a distance slightly greater than the diameter of the enlarged cylindrical ends 40 of the spools 36 so that the cartridge 12 may be easily inserted in the housing 60.

At the bottom of each channel 70 an arcuate surface 72 is formed. Said arcuate surface 72 is slightly larger than the radius of the enlarged cylindrical ends 40 and is spaced below the bottom surface of the ends 40 of the spools 36 of a cassette which is seated within the housing. This will permit the ends 40 to be fully rotatable without interference from any portion of the housing 60.

The knobs 44 which are attached to one of the enlarged cylindrical ends 40 of each spool 36 are positioned at the outer tips of the ends 40 and are spaced from the cassette side walls 22 a distance greater than the thickness of the side walls of a cover soon to be described.

In FIGS. 2 and 5 is illustrated the illuminating means which serves to back light the viewable portions of the map 18 and the information guide 19. The illuminating means includes a plurality of incandescent lamps 74 which are secured on the base bottom 58 by any suitable means and are positioned directly beneath the openings 29 on the bottom wall 30 of the cassette 12 to back light the viewable map and guide portions with maximum efficiency.

Light from the lamps 74 will pass through the openings 29 and illuminate the pellucid plates 32 and 34 which, in turn, evenly distribute the light directly beneath the map 18 and information guide 19, respectively.

The electrical circuit for energizing the lamps 74 is disclosed in FIG. 5. Included in the circuit is an electrical energy source such as dry batteries 76 attached to the base bottom 58 by any suitable means, such as clips 78.

The two dry batteries 76 are connected in series and the lamps are connected in a parallel circuit to the end terminals of the batteries 76.

A single pole single throw toggle switch 80 is secured to one side wall 62 of the housing and is electrically connected between one of the battery terminals and the parallel circuit to control the operation of the circuit.

Portions of the end walls 64 of the housing 60 extend above the height of the side walls 62 for the purpose of cooperating with a mating cover 16 in a manner to be described later. Additionally, these portions are vertically slotted from their top surface downwardly to the elevation of the side walls 62 to form tracks 82. Two tracks 82 are provided in each end wall 64 and are equidistantly spaced from the side edges of the end wall 64. The cover 16 carries a magnification apparatus and frame, portions of which engage the tracks 82 in a manner to be subsequently described.

The spools 36, journalled within the side walls 22 of the cassette 12 are free to rotate by manipulation of the knobs 44 thus positioning any desired portions of the map 18 and of the guide 19 within the viewing windows 26 and 28.

Thus there has been shown a map viewing cassette which is usable alone, or in conjunction with the base 14 which enhances the utility of the casssette by providing illumination for the portions of the map 18 and guide 19 which are viewable.

The operation and utility of the cassette alone or in combination with the base 14 is further enhanced when used in conjunction with a cabinet cover 16. Within the cabinet cover 16, means is provided for adjustably magnifying the face 20 of the cassette and thus enlarging the images of the portions of the map 18 and guide 19 which appear at the viewing windows 26 and 28.

As shown in the drawings, the cabinet cover 16 is constructed of opposed side walls 84 which may be generally rectangular in elevation with end walls 86 joining the ends of the opposed side walls. A rectangular top surface 88 is supported by the side and end walls and is disposed above an open bottom 90.

In order to provide visual access to the viewing windows 26 and 28, an enlarged rectangular opening 92 is formed within the top 88. The opening 92 is spaced inwardly from one end 94 of the top and equidistantly inwardly from the sides of the top so that it is surrounded by two side margins 96 of equal width, one end margin 98 and an extended end margin 100 which is wider than the margin 98.

The dimensions of the top surface 88, side walls 84, and end walls 86 are such that the cover 16 may be lowered over the housing 60 of the base 14. When in this interengaging position, the bottom edges of the walls of the cover 16 rest on the opposite side ledges 65, the end ledge 68 and the enlarged ledge 66 of the base 14.

In order for the cover 16 to enclose the cassette 12 and base 14 without interfering with the operation of the spools 36, a rectangularly shaped cut out portion 107 is formed in the bottom edge of the side walls 84. (See FIG. 1.) The upper edge of the cut out portion 107 is approximately at the same elevation as the centers of the enlarged ends 40 of the spools 36 of the cassette seated within the housing 60. To accommodate the ends 40, the upper edge of the cut out portion 107 is grooved with open ended downwardly facing U-shaped channels 109. The opposed edges of the open ends are spaced apart a distance greater than the diameter of the enlarged cylindrical ends 40 of the spools 36 so that the cover 16 easily lowers over the base 14 and cassette 12.

At the closed ends of the channels 109 arcuate surfaces 111 are formed. The radius of the arc of the arcuate surfaces 111 is slightly larger than the radius of the enlarged cylindrical ends 40 of the spools 36 and is spaced above the top surfaces of the ends 40 of the spools 36 of a cassette which is seated within the housing. This will permit the ends 40 to be freely rotatable without interference from the cover 16 which is seated over the base and cassette.

As shown in FIG. 4, the knobs 44 which are secured to one of the enlarged cylindrical ends 40 of each spool 36 are positioned at the tips of the ends 40 and are spaced from the cassette side walls 22 a distance greater than the combined thickness of the flange side wall 62 and the cover side wall 84.

As previously mentioned, magnifying means is included within the cover 16 for adjustably magnifying the portions of the map 18 and guide 19 which are exposed within the viewing windows 26 and 28. The magnifying means includes a plano-convex magnifying lens 102 fixed within a horizontal rectangular frame 104 so that the flat bottom 106 of the lens 102 is exposed at the central rectangular frame opening.

The frame 104 is constructed with parallel side channels 107 and parallel end channels 108 joining the side channels.

Horizontal legs 110, 113 extend from the opposite ends of each side channel 106. The legs 110, 113 are so positioned that when the cover 16 is over the base 14, said legs ride within the vertical tracks 82 formed in the side walls 62 of the housing 60. Depending guide fingers 112 are positioned at the ends of three legs 110 while the fourth leg 113 supports a vertical depending rack gear 114.

Engagement between the legs 110, 113 and the vertical grooves 82 serves to maintain the frame 104 in a side-to-side horizontal position as viewed in FIG. 3 while engagement between the depending guide fingers 112 and the opposing inner face of the cover end wall 86 and outer faces of the end walls 64 of the housing 60 serves to maintain the frame 104 in an end-to-end horizontal position as viewed in FIG. 2.

A gear train 116 mounted within and supported by the cover 16 engages the rack 114 to selectively vertically position the frame 104 and magnifying lens 102. The gear train 116 consists of two interengaged gears 118 and 120 which are secured on spindles 122 and 124, respectively. One end of each spindle 122 and 124 is journalled for rotation within the end wall 86 extending downwardly from the end of the margin 100. The opposite ends are journalled within a partition 125 which projects inwardly from the interior of a side wall 84. To prevent the frame 104 from lowering due to the weight of the lens 102, the spindles 122, 124 are journalled sufficiently tightly within the end wall 86 and partition 125 to prevent such slippage.

The end of the spindle 122 extending through the end wall 86 has a circular knob 126 secured thereto. The edge of the knob 126 is milled to facilitate manipulation.

The gear 120 engages both the gear 118 and the rack 114 so that by rotating the knob 126 the gear 118 is caused to rotate, which in turn rotates the gear 120 that engages the rack 114 and changes the vertical position of the rack 114 and frame 104 within the cover 16. Thus, the vertical position of the lens 102 is selectively adjusted by manipulation of the gear train.

To prevent interference between the horizontal rib 113 and the partition 125, a vertical track 130 is formed within said partition.

Thus, the map reader of the present invention is constituted of a map and information guide cassette which is usable alone or in conjunction with a base which supports the cassette and illuminates the viewing areas. Additionally, a cover is provided which can be positioned over the cassette and/or base if desired. Within the cover, an adjustable magnifying lens is provided to selectively enlarge the image within the viewing area of the cassette.

A kit may be employed constituting cassettes available for use with one base and cover. Each cassette is provided with a different map and information guide. The map route of an extended trip is found on a plurality of successive cassettes, each placed within the base 14 in the proper predetermined order. FIG. 8 illustrates the end portion of one map 18 and the beginning of a successive map 18 found in a successive cassette of a series for a trip. Portions of the cassette have been omitted in this view for the sake of clarity.

Thus it will be seen that there has been provided a road may reader which achieves the various objects of the invention and which is well adapted to meet the conditions of practical use.

As various possible embodiments might be made of the present invention and as various changes might be made in the embodiment above set forth, it is to be understood that all matter herein described or shown in the accompanying drawings is to be interpreted as illustrative and not in a limiting sense.

Having thus described the present invention, there is claimed as new and desired to be secured by Letters Patent:

1. A road map reader for displaying selected portions of an elongated strip map, said map reader comprising a hollow cabinet base having side walls and end walls and being opened at the top, horizontal flange in the bottom of said cabinet, said hollow cabinet being provided with U-shaped channels in the side walls open at their upper edges and having arcuate surfaces at their bottoms, a cassette having a top, a bottom, side and end walls and adapted to fit within said hollow cabinet and rest upon said horizontal flange, said cassette having a first viewing area within said top, said bottom of said cassette having an opening, an elongated strip may be permanently mounted within said cassette for movement of selected portions thereof within said viewing area, a first pair of spools mounted within said cassette, each end of said map being connected to a different one of the spools of said pair, a portion of said map lying within said first viewing area, means for rotatably supporting each of the spools of said pair, said means including a formation projecting from one end of each of said spools and journalled in said side walls, a knob connected to each of said formations and adapted to protrude through said U-shaped channels in the side walls of said hollow cabinet base, said cassette being nestably positioned and removable from said horizontal flange, electric illuminating means positioned beneath said cassette and positioned in alignment with said opening to illuminate the portions of said map exposed through said first viewing area through said opening in said cassette bottom.

2. The road map reader of claim 1 further including a planar pellucid supporting surface mounted within said cassette beneath said first viewing area, said supporting surface being substantially parallel to said cassette top.

3. The road map reader of claim 2 further including a cover having an open bottom and positioned over said cassette and base, said cover including a magnifying lens for enlarging the images viewable in said first viewing area.

4. The road map reader of claim 3, said magnifying lens being mounted to a frame, said frame having guide means for maintaining said frame parallel to the top of the cassette and means for adjustably changing the space between said frame and the top of the cassette.

5. The road map reader of claim 4 wherein said means for changing the space between said frame and the cassette includes a rack carried by said frame and a gear journalled in said cover and engaging said rack.

6. The road map reader of claim 5 wherein said guide means include formations projecting from said frame and engaging tracks formed within said base.

7. The road map reader of claim 1 further including a second viewing area within said cassette top, an elongated strip information guide permanently mounted within said cassette for movement of selected portions thereof within said second viewing area, a second pair of spools mounted within said cassette, each end of said information guide being connected to a different one of the spools of said second pair, a portion of said information guide lying within said second viewing area, means rotatably supporting each of the spools of said second pair, said means including a second formation projecting from one end of each of said spools and journalled through said side walls, and a knob connected to each of said second formations.

8. The road map reader of claim 7 further including planar pellucid supporting surfaces mounted within said cassette beneath each of said viewing areas, said supporting surfaces being substantially parallel to said cassette top.

9. The road map reader of claim 8 further including a cover having an open bottom and positioned over said cassette and base, said cover including a magnifying lens for enlarging the images viewable in said viewing areas and means for adjustably changing the vertical position of said lens within said cover.

10. A road map travel kit for use on automobile trips, said kit comprising a hollow cabinet base having sidewalls and open at the top, a horizontal flange disposed in the bottom of said cabinet, and adapted to support a cassette, said hollow cabinet being provided with U-shaped channels in the side walls open at their upper edges and having arcuate surfaces at their bottoms, each of said cassettes having a top, a first viewing area within said top, a bottom, side and end walls, said bottom having an opening, a different elongated strip map and pair of associated spools permanently mounted within each of said cassettes, each end of each map being connected to a different one of the spools of the associated pair, a portion of each map lying within said viewing area, means rotatably mounting each of the spools of each pair in its associated cassette, said means including a formation projecting from one end of each of said spools and journalled through said side walls of the associated cassette, and a knob connected to each of said formations, each of said knobs adapted to protrude through the U-shaped channels in the side walls of said hollow cabinet, each of the elongated strip maps in each of said cassettes being one of a series and presenting, when viewed in successive order, a continuous map and information guide of an entire automobile trip, said kit further including said horizontal flange for nestably supporting each cassette at a position above the base of said hollow cabinet, electric illuminated means supported by said base of said hollow cabinet and positioned to illuminate the first viewing areas of the cassette on said base through said opening whereby said successive elongated strip maps are viewable after positioning successive cassettes upon said horizontal flange as the trip progresses.

11. The road map kit of claim 10 further including a cover having an open bottom, said cover being positionable over said base, and a magnifying lens mounted within said cover for enlarging the images viewable in each said viewing areas.

12. The road map kit of claim 11 including means for adjustably changing the position of said lens within said cover to selectively vary the magnification of the images.

13. A road map reader for displaying selected portions of an elongated strip map, said map reader comprising a hollow cabinet base having side walls and end walls and open at its top, a horizontal flange disposed in the bottom of said cabinet, said hollow cabinet being provided with said U-shaped channels in the side walls open at their upper edges and having arcuate surfaces at their bottoms, said map reader being provided with a hollow cassette having a top, a bottom, and end walls, a first viewing area within said top of said cassette and an elongated strip map mounted within said cassette for movement of selected portions thereof within said first viewing area, a pair of spools rotatably mounted within said cassette, each end of said map being connected to a different one of the spools of said pair, a portion of said map lying within said first viewing area, means for rotating each of the spools of said pair, said means including a formation projecting from one end of each of said spools and journalled through said side walls, a knob connected to each of said formations and adapted to protrude through the U-shaped channels in the side walls of said hollow cabinet base, a cover including a magnifying lens for enlarging images viewable in said viewing area and means for adjustably changing the position said magnifying lens within said cover to selectively vary the magnification of the map portion positioned atop said hollow cabinet base.

14. The road map reader of claim 13, said magnifying lens being mounted to a frame, said frame having guide means for maintaining said frame in a position within said cover, parallel to the top of the cassette.

15. The road map reader of claim 13 further including a second viewing area within said cassette top, an elongated strip information guide permanently mounted within said cassette for movement of selected portions thereof within said viewing area, a second pair of spools mounted within said cassette, each end of said information guide being connected to a different one of the spools of said second pair, a portion of said information guide lying within said second viewing area, means rotatably supporting each of the spools of said second pair, said means including a formation projecting from one end of each of said spools and journalled through said side walls, and a knob connected to each of said formations.

References Cited
UNITED STATES PATENTS

| | | | |
|---|---|---|---|
| 997,166 | 7/1911 | Weber | 40—86 |
| 1,833,595 | 11/1931 | Samson et al. | 206—19.5 |
| 2,498,476 | 2/1950 | Alfonso | 40—86 |
| 2,764,826 | 10/1956 | Fulton et al. | 40—86 |

ROBERT W. MICHELL, Primary Examiner

L. R. OREMLAND, Assistant Examiner